(12) United States Patent
Joubert et al.

(10) Patent No.: US 6,248,685 B1
(45) Date of Patent: Jun. 19, 2001

(54) CATALYST

(75) Inventors: Dawid Johannes Joubert, Sasolburg; Ignatius Hendrik Potgieter, Vanderbijlpark; Ioan Tincul, Sasolburg, all of (ZA)

(73) Assignee: Sasol Technology PTY Limited, Johannesburg (ZA)

( * ) Notice: Subject to any disclaimer, the term of this patent is extended or adjusted under 35 U.S.C. 154(b) by 0 days.

(21) Appl. No.: 09/194,673

(22) PCT Filed: Jun. 2, 1997

(86) PCT No.: PCT/GB97/01480

§ 371 Date: Apr. 1, 1999

§ 102(e) Date: Apr. 1, 1999

(87) PCT Pub. No.: WO97/45460

PCT Pub. Date: Dec. 4, 1997

(30) Foreign Application Priority Data

May 31, 1996 (WO) .................................. PCT/GB96/01294
Nov. 8, 1996 (ZA) ..................................... 96/9415
Nov. 27, 1996 (ZA) ..................................... 96/9965

(51) Int. Cl.[7] ............................. B01J 31/00; B01J 37/00; C08F 4/02; C08F 4/60
(52) U.S. Cl. .......................... 502/111; 502/107; 502/125; 502/126; 502/132; 502/134
(58) Field of Search .................................. 502/107, 125, 502/126, 132, 134, 111

(56) References Cited

U.S. PATENT DOCUMENTS

| 3,803,105 | * | 4/1974 | Galli et al. ........................... 502/134 |
| 5,258,449 | * | 11/1993 | Firdaus et al. ..................... 526/348.5 |
| 5,780,378 | * | 7/1998 | Toida et al. .......................... 502/111 |
| 6,034,025 | * | 3/2000 | Yang et al. .......................... 502/125 |
| 6,127,304 | * | 7/1998 | Sacchetti et al. .................... 502/134 |

FOREIGN PATENT DOCUMENTS

| 0 021 605 | * | 1/1981 | (EP) . |
| 0 444 606 | * | 9/1991 | (EP) . |
| 0492788 | | 7/1992 | (EP) . |
| 0522651 | | 1/1993 | (EP) . |
| 0544340 | | 6/1993 | (EP) . |
| 0281524 | | 9/1998 | (EP) . |
| 9638485 | | 12/1996 | (WO) . |

\* cited by examiner

*Primary Examiner*—Mark L. Bell
*Assistant Examiner*—J. Pasterczyk
(74) *Attorney, Agent, or Firm*—Ladas & Parry

(57) ABSTRACT

A method of making a catalyst suitable for the polymerization of olefins includes the steps of mixing an ether having a total number of carbon atoms equal to or greater than 8, with hydrated magnesium chloride, to produce partially activated magnesium chloride; mixing an alkyl aluminum with the partially activated magnesium chloride to form unwashed activated magnesium chloride; and washing the activated magnesium chloride with an inert saturated hydrocarbon liquid, to obtain an activated magnesium chloride-containing slurry. A plurality of alcohols are mixed with the activated magnesium chloride-containing slurry to form an activated magnesium chloride/alcohol complex. Titanium tetrachloride is mixed with the activated magnesium chloride/alcohol complex, to form a magnesium chloride supported titanium catalyst.

15 Claims, No Drawings

CATALYST

THIS INVENTION relates to a catalyst. It relates in particular to a catalyst and catalyst system for use in the polymerization of olefins, to a method of making such a catalyst, and to a method of polymerization.

According to a first aspect of the invention, there is provided a method of making a catalyst suitable for the polymerization of olefins, which method comprises:

mixing an ether having a total number of carbon atoms equal to or greater than 8, with magnesium chloride, to produce partially activated magnesium chloride;

mixing an alkyl aluminium with the partially activated magnesium chloride to form unwashed activated magnesium chloride;

washing the activated magnesium chloride with an inert saturated hydrocarbon liquid, to obtain an activated magnesium chloride-containing slurry;

mixing a plurality of alcohols with the activated magnesium chloride-containing slurry to form an activated magnesium chloride/alcohol complex; and mixing titanium tetrachloride with the activated magnesium chloride/alcohol complex, to form a magnesium chloride supported titanium catalyst.

Thus, the catalyst obtained by this method is a specific titanium catalyst supported on specifically activated magnesium chloride. The magnesium chloride is hence a catalyst support. The ether and alkyl-aluminium compound mixing steps constitute magnesium chloride support activation steps, while the alcohols and titanium chloride ($TiCl_4$) mixing steps constitute catalyst loading steps.

As is known, magnesium chloride forms five hydrates, namely $MgCl_2.12H_2O$, $MgCl_2.8H_2O$, $MgCl_2.6H_2O$, $MgCl_2.4H_2O$ and $MgCl_2.2H_2O$. The most important of these from an application or general use point of view is the hexahydrated form, $MgCl_2.6H_2O$, which is the general raw material used for obtaining, by known methods, $MgCl_2.2H_2O$. It is also known that olefin polymerization processes are influenced detrimentally by even minute amounts of water present in the reaction medium or in a Ziegler-Natta catalyst used in such processes. Attempts to use, in olefin polymerization, known Ziegler-Natta catalysts based on magnesium chloride and containing even a very low proportion of water, have resulted in a decrease in the productivity of olefin polymerization beyond an efficient or practical application. Consequently, substantial effort is normally required to render the hydrated support material completely dry. All these methods are laborious and expensive. In many cases, a drying agent is employed, and some of the drying agent remains as a complex in the resultant catalyst, with undesired consequences on the catalyst performance.

It was surprisingly found that, with catalysts made according to the method of the present invention, limited amounts of water in the magnesium chloride can not only be tolerated, but are in fact desirable for imparting particular properties to the catalyst. The inventors have discovered, surprisingly, that a certain amount of water present in the initial support, if combined using the specific method of catalyst preparation herein described, imparts excellent application properties to the final catalyst. Thus, according to the invention, the magnesium chloride may be partially anhydrized. In other words, the magnesium chloride may have a water content of between 0.02 mole of water/1 mole of $MgCl_2$ and 2 moles of water/1 mole of $MgCl_2$, preferably between 0.08 mole of water/1 mole of $MgCl_2$ and 0.3 mole of water/1 mole of $MgCl_2$. This specified amount of water, by way of its distribution, participates in formation of the specific activated support. For low water content, known magnesium chloride anhydrization methods can be employed, except those where an anhydrization agent remains in the $MgCl_2$ after washing of the anhydrized magnesium chloride with an inert hydrocarbon liquid. In particular, anhydrization with organic acid esters should be avoided.

The terms "partially anhydrized" and "anhydrous", as used in respect of magnesium chloride refer to the hydration water limits given above. This precludes side interpretations such as that $MgCl_2.2H_2O$ is an "anhydrized" product if compared with $MgCl_2.6H_2O$, or that a 1.5% water containing magnesium chloride is considered "non anhydrous" when compared with a 0.1% water containing magnesium chloride". Thus, the partially anhydrized magnesium chloride may have a water content of 1.5%, or even 5%, on a mass basis.

The support activation steps are preferably effected under inert conditions, ie in a substantially oxygen and water free reaction environment. The reaction environment should also be substantially free of any reacting products other than the reactants used for each specific step of the catalyst preparation.

In the making or preparation of the catalyst according to the invention, the support activation constitutes a fundamental stage. Attempts to react $MgCl_2$ directly with $TiCl_4$ result in hardly any fixation of titanium taking place, probably due to high crystal order, low surface area and low pore volume. Methods to decrease the crystallinity and increase the surface and pore volume of $MgCl_2$ in general, are known. However, when these methods were employed instead of the catalyst support activation steps used in the present method, a totally different catalyst is obtained, with totally different performances. It was unexpectedly found that only when using the activation procedure as herein described, is a new catalyst, with excellent performance, obtained in the final step.

The activation procedure thus comprises, as hereinbefore stated, mixing the ether having a total number of carbon atoms equal to or greater than 8, with the magnesium chloride, to produce the partially activated magnesium chloride;

mixing the alkyl aluminium with the partially activated magnesium chloride to form the unwashed activated magnesium chloride; and washing the activated magnesium chloride with the inert saturated hydrocarbon liquid, to obtain the activated magnesium chloride-containing slurry.

It was also surprisingly found that the desired effect is not achieved with any ether. Thus, the ether is selected from the range of ethers having a total carbon atom number equal to or greater than 8. The ether may be a linear ether with a total number of carbon atoms between 8 and 16, and being of the type R'—O—R" where R'=R". Particularly, ethers with a total number of carbon atoms less than 8, are not suitable for the activation procedure hereinbefore described. Moreover, mixtures of ethers each having a total carbon number equal to or greater than 8 can be used. The ether may be dibutyl ether or, preferably, dipentyl ether.

The molar ratio of partially anhydrized magnesium chloride to ether may be between 0.3:1 and 3:1. Preferably, the molar ratio of magnesium chloride to ether is between 1:1 and 2.5:1.

Typical alkyl aluminiums or alkyl-aluminium compounds that can be used are trialkyl-aluminium compounds expressed by the formula $AlR_3$ wherein R is an alkyl radical or alkyl component having 1 to 10 carbon atoms. Specific examples of suitable trialkyl-aluminium compounds which can be used are tributyl aluminium, tri-isobutyl aluminium, trihexyl aluminium, and trioctyl aluminium. It was surprisingly found that only alkyl-aluminium compounds with no halogen content can be used, to achieve the control of the performances of the newly developed catalyst. The preferred trialkyl-aluminium compound is triethyl-aluminium. The molar ratio of the alkyl-aluminium compound to the anhydrous magnesium chloride may be between 1:1 and 6:1. The preferred molar ratio of the alkyl-aluminium compound to the anhydrous magnesium chloride is 4:1 to 5:1. However, it is an important feature not only of the activation step but also of the specific method of achieving the final complex catalyst that the alkyl aluminium compound be added in a specific amount to suit a specific performance target for the final catalyst.

In one embodiment of this step of the support activation, the molar ratio of the alkyl-aluminium compound to the magnesium chloride can be toward the bottom of the selected range. Thus, in this case, the main target of the alkyl-aluminium compound is the support activation and its preparation for the fixation of the titanium compound. In this case, the proportions of the components may be selected to comply with formula (1):

$$A > B + C + D \tag{1}$$

where
  A represents the total moles of the alkyl-aluminium compound used;
  B represents the total moles of $MgCl_2$ used;
  C represents the total moles of ether used;
  D represents the total moles of water present, being the sum of the water of hydration associated with the $MgCl_2$ and any water traces in a carrier liquid (when present) for the mixture of ether and $MgCl_2$, as hereinafter described.

In another embodiment of the support activation, the molar ratio of the alkyl-aluminium compound to the magnesium chloride can be towards the top of the selected range. Then, additionally to the support activation and its preparation for the fixation of the titanium compound, a larger amount of alkyl remains available for the reduction of $Ti^{4+}$. In this case, based on the total aluminium content measured after washing the activated support with the hydrocarbon carrier liquid, the total amount of the alcohols used in the preparation of the activated support/alcohol complex, and the composition of the alcohol combination used, the level of the alkyl linked to the aluminium in the activated support/alcohol complex obtained in the next step of the catalyst preparation, can be predicted. It is important to predict from this early stage of the catalyst preparation some limits for the next step of preparation. A catalyst more suitable for copolymerization and terpolymerization may then be obtained.

The mixing of the activators, ie the ether and the alkyl-aluminium compound, can be performed in various ways with the proviso that the ether is first mixed with the magnesium chloride, whereafter the mixing of alkyl aluminium compound takes place.

Thus, in one embodiment of the activation stage, the ether can be added to the $MgCl_2$ in solid particulate form, and the mixture stirred by mechanical means for a period of 10 minutes to 24 hours, preferably 1 hour to 12 hours. The temperature during the stirring can range between 40° C. and 140° C. After said stirring, the mixture can then be cooling down to a temperature below 20° C., whereafter the alkyl-aluminium compound can be added directly to the $MgCl_2$ treated with the ether, or after suspending the mixture in an inert hydrocarbon carrier liquid. The hydrocarbon carrier liquid is inert, ie it does not partake in the activation reactions. It may be an aliphatic or cyclo-aliphatic liquid hydrocarbon, with hexane and heptane being preferred.

In another embodiment of the activation stage, the ether can be added to a suspension of the $MgCl_2$ in an inert hydrocarbon liquid, and the mixture stirred by mechanical means for a period of 30 minutes to 24 hours, preferably 1 to 12 hours. The temperature of the mixture during the stirring may be between 40° C. and the reflux temperature of the inert hydrocarbon liquid but should not exceed 140° C. After cooling down the mixture to below 20° C. under stirring, the alkyl-aluminium compound can be added directly to the mixture or admixed with an inert hydrocarbon liquid, with vigorous stirring. The hydrocarbon liquid is thus inert, ie it does not partake in the activation reactions. It may be an aliphatic or cyclo-aliphatic liquid hydrocarbon, with hexane and heptane being preferred.

It was found that best results are obtained by effecting the addition of the alkyl-aluminium compound in drop-wise fashion by making use of a pure alkyl aluminium compound in liquid form or using a solution of the alkyl-aluminium compound in an inert hydrocarbon liquid as described above. The manner of addition and the conditions selected for this step of the catalyst preparation are important to achieve a high degree of activation of the activated support for further catalyst preparation.

The activated support-containing slurry is, as mentioned, washed with an inert saturated hydrocarbon liquid, such as hexane, before adding the alcohols thereto. The washing may be severe, eg repeated a number of times, typically 10–20 times. At this stage, the activated support should be checked for the absence of the initial ether employed in the first step of the activation. The absence of the initially introduced ether is an important feature of the method of the invention.

The observable effect of each step of activation is the disordering of the magnesium chloride crystal structure and an increase of surface area and of pore volume. However, a direct relationship between the performance of the resultant catalyst and the surface area, as determined by the BET method, was not observed. On the contrary, the inventors believe that the effect of the surface area on the catalyst performance is of reduced importance. However, in contrast, it was found that the increase in pore volume enhances the performance of the resultant catalyst. It is believed that, as a result of the specific manner of activation, a specific level of surface defects and crystal disorder is achieved regardless of the surface area, for each particular case selected from the multitude of possibilities provided by the established limits of the two steps of activation. However, it was, at the same time, surprisingly found that only by adhering to the method described, is a suitable support for the preparation of the catalyst according to this invention obtained.

The next step of the catalyst preparation is, as mentioned, mixing a plurality of alcohols with the activated support-containing slurry to form a particularly activated support/alcohol complex.

While the alcohols can be mixed separately with the slurry, they are preferably used as a multicomponent mixture. The alcohol mixture may thus be added to the slurry. A dicomponent, tri-component or a higher multicomponent alcohol mixture can thus be used. The Applicant has surprisingly found that particularly good results are obtained with a tri-component alcohol mixture.

The alcohol mixture addition may be effected under stirring. The stirring time may be between 1 minute and 10 hours, preferably between 5 minutes and 4 hours. The temperature range can be between 0° C. and the lower of the boiling point of any one of the alcohols of the alcohol mixture or the solvent used in the activation step, more preferably between 0° and ambient temperature.

Each alcohol may have between 2 and 10 carbon atoms. The most preferred alcohols are those having the same number of carbon atoms as the monomers used in a method of polymerization thereof, wherein the catalyst, the product of this method of catalyst preparation, is also used. Preferred dicomponent alcohol mixtures are ethanol and propanol; ethanol and 1-butanol; ethanol and 1-pentanol; ethanol and 1-hexanol; etanol and 1-heptanol and etanol and 1-octanol. The molar proportion of the one alcohol to the other alcohol in the dicomponent mixture can vary widely, but is preferably about 1:1. Preferred tri-component or three component alcohol mixtures are ethanol, propanol and 1-butanol; ethanol, propanol and 1-pentanol; ethanol, propanol and 1-hexanol; ethanol, propanol and 1-heptanol; ethanol, propanol and 1-octanol; ethanol, 1-butanol and 1-pentanol; ethanol, 1-butanol and 1-hexanol; ethanol, 1-butanol and 1-heptanol; ethanol, 1-butanol and 1-octanol; ethanol, 1-pentanol and 1-hexanol; ethanol, 1-pentanol and 1-heptanol; ethanol, 1-pentanol and 1-octanol; ethanol, 1-hexanol and 1-heptanol; ethanol, 1-hexanol and 1-octanol; ethanol 1-heptanol and 1-octanol. The molar proportions of the respective alcohols in such tri-component mixtures can vary widely.

In general, the molar ratio of the alcohol mixture to the anhydrous magnesium chloride used initially, may be between 0.4:1 and 4:1, preferably between 0.8:1 and 2.5:1.

In one embodiment of the invention, the amounts of the alcohols used may be such that formula (2) is complied with:

$$[A]<[Al] \quad (2)$$

where [A] represents the total moles of alcohols added and [Al] is the measured moles of aluminium present in the activated magnesium chloride-containing slurry.

In another embodiment of the invention, the amounts of the alcohols used may be such that formula (3) is complied with:

$$[A]<2[Al]/3 \quad (3)$$

where [A] and [Al] are as hereinbefore defined.

In yet another embodiment of the invention, the amounts of the alcohols used may be such that formula (4) is complied with:

$$[A]<[Al]/3 \quad (4)$$

where [A] and [Al] are as hereinbefore defined.

Thus, from particular cases of any activated support/alcohol complex prepared according to this invention with the specific ability to reduce a part of the titanium tetrachloride subsequently added to $Ti^{3+}$ and $Ti^{2+}$, a large range of new Ziegler-Natta type catalysts in accordance with the invention can be prepared.

The mixing of the titanium tetrachloride with the activated magnesium chloride/alcohol complex or activated support/alcohol complex, may be effected by adding the titanium tetrachloride to the activated support/alcohol complex.

After the titanium chloride has been added, the resultant slurry may be stirred under reflux for a period of 10 minutes to 5 hours, preferably 1–2 hours. However the temperature can be lowered in increments of 1° C. if desired, but the stirring time should then be increased, eg by around 5 minutes for each degree Celsius which the temperature is lowered. Thereafter the slurry is allowed to cool, eg for about 24 hours. The catalyst in the slurry is washed with an inert saturated hydrocarbon liquid, preferably the same hydrocarbon liquid as is used for washing the activated magnesium chloride. Preferably, this hydrocarbon liquid is hexane or heptane. The washing may be repeated a number of times, typically between 10 and 40 times, eg about 20 times.

The molar ratio of titanium chloride to magnesium chloride used initially, may be between about 1:2 and about 20:1, preferably between 2:1 and 10:1.

The final washing removes the inactive compounds formed during the complex reactions of the last two steps. It also removes any unreacted titanium tetrachloride and weakly bound titanium chlorides absorbed on the support surfaces and which apparently do not participate in the formation of active centres. The observable effect is an increase in the catalyst surface area and pore volume and an increase of activity per gram of titanium added. It was found that catalysts with different properties are obtained when different numbers of washing are employed.

The resultant catalyst is particularly suited for the polymerization of olefins, particularly when used as part of a catalyst system which includes also a suitable co-catalyst.

The invention accordingly extends also to a catalyst when obtained by the method of the first aspect of the invention.

The catalyst is thus obtained by following each step of the method of making the catalyst hereinbefore described. A large diversity of catalysts are obtainable due to the large number of different combinations of parameters that can be selected within the limits prescribed in each step, and each particular catalyst has a complex structure.

More particularly, the catalyst can be a catalyst selected from the catalyst range obtainable by the method of the first aspect of the invention, and having a total magnesium content between 0.1% and 6% (mass basis), a total magnesium content between 3% and 15% (mass basic), and a total titanium content between 3 and 15% (mass basis), providing that the mass ratio of magnesium to titanium is below 3:1.

Thus, according to a second aspect of the invention, there is provided a magnesium chloride-supported titanium catalyst comprising magnesium chloride as a catalyst support, titanium and aluminium, and having a total aluminium content between 0.1% and6% (mass basis), a total magnesium content between 3% and 15% (mass basis), and a total titanium content between 3 and 15% (mass basis), with the mass ratio of magnesium to titanium being below 3:1.

More particularly, the catalyst may have a $Ti^{3+}$ content of less than 50% of the total titanium present therein. In one embodiment,the sum of $Ti^{3+}$ and $Ti^{2+}$ may be less than 50% of the total titanium present therein. In another embodiment, the sum of $Ti^{3+}$ and $Ti^{2+}$ may be less than 10% of the total titanium present therein. In an even more particular embodiment, the ratio of $Ti^{3+}$ to $Ti^{2+}$ in the catalyst may be greater than 5:1.

Further, according to a third aspect of the invention, there is provided a catalyst system which comprises a catalyst as hereinbefore described; and an aluminium compound as a co-catalyst.

The co-catalyst may be, or comprise, an organo-aluminium compound. Typical organo-aluminium compounds which can be used are compounds expressed by the formula $AlR_mX_{3-m}$ wherein P is a hydrocarbon radical or component of 1 to 15 carbon atoms, X is a halogen atom, and m is a number represented by $0 \leq m \leq 3$. Specific examples of suitable organo-aluminium compounds which can be used are trialkyl aluminium, trialkenyl aluminium, partially halogenated alkyl aluminium, alkyl aluminium sesquihalide and alkyl aluminium dihalide. Preferred organo-aluminium compounds are an alkyl aluminium, and the most preferred of these is triethylaluminium. The atomic ratio of aluminium to titanium in the catalyst system may be between 0.1:1 and 15000:1, preferably between 1:1 and 7500:1.

The catalyst and catalyst system according to the invention have one or more application advantages which distinguish them further over known Ziegler-Natta catalysts.

The catalyst and the catalyst system according to the invention are characterized thereby that they have high catalytic activity, and that they do not have to be extracted from the product following the polymerization. Thus, the catalyst or the catalyst system may have a productivity greater than 10000 grams of polymer/gram of catalyst. In other words, in the case where, for example, ethylene is reacted using the catalyst or the catalyst system to obtain homopolymers, or when ethylene is copolymerized, using the catalyst or the catalyst system, with an olefin selected from the group of propylene, 1-butene, 1-pentene, 1-hexene, 1-heptene, 1-octene, 1-nonene and 1-decene, in either linear form or branched form except isomers where the branch is attached to a carbon atom connected to another carbon atom by a double bond, a productivity greater than 10000 grams of polymer/gram of catalyst is obtained. In particular, the catalyst or the catalyst system may have a productivity greater than 30000 grams of polymer/gram of catalyst, or even greater than 100000 grams of polymer/gram of catalyst.

Similarly, in the case where, for example, terpolymerization is effected between ethylene, 1-pentene and a monomer selected from the olefin group of propylene, 1-butene, 1-hexene, 1-heptene, 1-octene, 1-nonene and 1-decene, in either linear form or branched form except isomers where the branch is attached to a carbon atom connected to another carbon atom by a double bond, and the catalyst or the catalyst system is used, a productivity greater than 10000 grams of terpolymer/gram of catalyst may be obtained.

In the case where, for example, terpolymerization is effected between ethylene, 1-pentene, and 1-hexene, and using the catalyst or the catalyst system, a productivity greater than 25000 grams of terpolymer/gram of catalyst may be obtained.

The catalyst and the catalyst system according to the invention have a suitable rate of incorporation of alpha olefin during a copolymerization, a terpolymerization or a multiple polymerization of ethylene with the alpha olefin(s). The catalyst or catalyst system thus provides an easy way of controlling the density of the polymer, and thus implicitly controlling those properties which depends on the density of the polymer.

When used in a terpolymerization of a monomer feedstock comprising ethylene and two alpha olefins each having a total carbon number between 4 and 8 and whose total carbon numbers differ by one, the catalyst may have the ability to incorporate in the terpolymer amounts of these monomers which differ less than 25% from the proportions of these monomers in the feedstock.

The catalyst and the catalyst system according to this invention may have a rate enhancement effect during copolymerization and terpolymerization under different process conditions rendering it suitable for particular high efficiency copolymerization and terpolymerization processes.

The catalyst and catalyst system according to this invention are suitable for molecular weight control of the resulting polymer and to the use of hydrogen as regulating agent for the molecular weight of the polymer. The molecular weights of the resultant polymers decrease with increasing catalyst and/or hydrogen concentration. Thus the application properties related to the molecular weight of the polymer can easily be controlled. The catalyst and catalyst system according to this invention may have a polydispersity index below 4 when used in a copolymerization or terpolymerization of ethylene with alpha olefin(s).

Different catalysts of this invention, when prepared between the particular limits prescribed in each step can, be used in a process for obtaining different molecular weight distribution of the resulting polymer. In one embodiment of this aspect of the invention, the molecular distribution is lower than 4.

The catalyst and catalyst system according to this invention have a practical storage time under certain handling conditions. No practical decrease of activity was observed for a sample of the catalyst kept in a conventional dry box under inert conditions at 15° C. after one month storage time.

The catalyst and catalyst system according to this invention are suitable for restarting a slurry polymerization after a "freezing time" of up to 12 hours. "Freezing time" is defined as the time that has elapsed between an interruption of supplying monomers to the polymerization zone with a simultaneous drop of reaction temperature to ambient temperature, preferably 15° C. and reheating to the reaction temperature with the restart of the supply of the monomers, with the slurry being kept under stirring and no product being evacuated from the reaction zone during this time.

The combination of the advantages mentioned above make the catalyst and catalyst system according to this invention an improved catalyst and catalyst system for industrial applications compared to known Ziegler-Natta catalysts.

The various steps of the catalyst preparation are practical steps making the catalyst preparation suitable for industrial application. The most time consuming operation, ie the washing operation, is benefitted by the favourable sedimentation time of the catalyst. "Sedimentation time" is defined as the time required for 25ml of a stirred suspension of 0.5 grams of catalyst in-heptane to settle down when transferred to a graduated ampoule, with the time being measured at 20° C. and from the moment of transfer of the suspension in the measuring ampoule up to the time when the solution above the sedimented catalyst is completely clear. Generally, it was found that the activated supports have good sedimentation times, $T_1$, of less than 20 minutes, while the final catalysts have good sedimentation times, $T_2$, of less than 30 minutes. It was surprisingly found that excellent performances are obtained from those catalysts according to this invention which have $T_1$<10 minutes and $T_2$<20 minutes, and particularly where $T_1$<5 minutes and $T_2$<15 minutes. It was also surprisingly found that catalysts according to this invention having a good balance between compactness of the finally prepared catalyst as determined by the sedimentation time and fragmentation during polymerization, also gave good performance during polymerizations using the catalysts.

According to a fourth aspect of the invention, there is provided a method of polymerization, which method comprises reacting at least one olefin in the presence of a catalyst, or a catalyst system, as hereinbefore described, thereby to obtain a polymer of the olefin.

The reaction may be effected in a single reaction zone, at a pressure between atmospheric pressure and 200 $kg/cm^2$, and at a reaction temperature between ambient and 120° C.

Suitable olefins are α-olefins having a total number of carbon atoms between 2 and 10, such as ethylene, propylene, 1-butene, 1-pentene, 1-hexene, 1-heptene, 1-octene, 1-nonene or 1-decene, in either linear form or branched form except isomers where the branch is attached to a carbon atom connected by a double bond to another carbon atom.

In one embodiment of the method of polymerization, a single olefin may be homopolymerized in the presence of the catalyst or the catalyst system.

In another embodiment of the invention, at least two of the olefins may be reacted in the presence of the catalyst or the catalyst system, to obtain copolymers of the two olefins. A catalyst according to the invention and prepared by using a dicomponent alcohol mixture in the activated support/alcohol complex preparation step, may be used. The two alcohols may have the same number of carbon atoms as the olefin used for the copolymerization. Preferred copolymers are copolymers of ethylene with a linear alpha olefin. Examples of such copolymers are copolymers of ethylene and propene; ethylene and 1-butene; ethylene and 1-pentene; ethylene and 1-hexene; ethylene and 1-heptene and ethylene and 1-octene.

In yet another embodiment of the invention, three of the olefins may be reacted in the presence of the catalyst or the catalyst system, to obtain terpolymers of the olefins. A catalyst according to the invention and prepared by using a tricomponent alcohol mixture in the activated support/alcohol complex preparation step, may be used. The three alcohols may have the same number of carbon atoms as the olefin used for the terpolymerization.

Preferred examples of such terpolymers are terpolymers of ethylene with 2 monomers selected from the olefin group of propylene, 1-butene, 1-pentene, 1-hexene, 1-heptene, 1-octene, 1-nonene and 1-decene, in either linear form or branched form except isomers where the branch is attached to a carbon atom connected to another carbon atom by a double bond.

More preferred examples of such terpolymers are those which contain at least one linear alpha olefin. Examples of such terpolymers are terpolymers of ethylene, propylene and 1-butene; ethylene, propylene and 1-pentene; ethylene, propylene and 1-hexene; ethylene, propylene and 1-heptene; ethylene, propylene and 1-octene; ethylene, 1-butene and 1-pentene; ethylene, 1-butene and 1-hexene; ethylene, 1-butene and 1-heptene; ethylene, 1-butene and 1-octene; ethylene, 1-pentene and 1-hexene; ethylene, 1-pentene and 1-heptene; ethylene, 1-pentene and 1-octene; ethylene, 1-hexene and 1-heptene; ethylene, 1-hexene and 1-octene; ethylene, 1-heptene, and 1-octene.

The most preferred examples of ethylene containing terpolymers are terpolymers of ethylene with 1-pentene and a third olefin selected from the olefin group of propylene, 1-butene, 1-hexene, 1-heptene, 1-octene, 1-nonene and 1-decene, in either linear form or branched form except isomers where the branch is attached to a carbon atom connected to another carbon atom by a double bond.

The invention will now be described by way of the following non-limiting examples:

EXAMPLE 1

Catalyst (A) Preparation.

In a 250 ml flask equipped with a reflux condenser and stirring facilities, 2 g of anhydrous magnesium chloride with a total water content of 5% (by mass) was suspended in 60 ml highly purified hexane. The suspension temperature was raised to 45° C., whereafter 2 ml of dibutyl ether was added to the flask and the mixture stirred for 3 hours. Thereafter, the heating was stopped, the heat of mixture allowed to dissipate, and the temperature allowed to drop to ambient temperature 9 g of triethyl aluminium ('TEA') was then added dropwise to avoid excessive heat build-up, and the resultant slurry allowed to cool to room temperature under stirring. The slurry was then subjected to twelve washings using 50 ml hexane each time, to obtain an activated support-containing slurry.

To the activated support-containing slurry was added 2 ml of a 2:1:1 molar mixture of ethanol, 1-butanol and 1-pentanol, and the slurry stirred for 3 hours at ambient temperature. 20 ml of $TiCl_4$ was then added to the slurry, and the resultant mixture stirred under reflux for 2 hours. After cooling down, the slurry was subjected to ten washings using 50 ml hexane each time. After the final washing the slurry concentration was adjusted, by hexane addition, to 0,01 g magnesium chloride supported titanium catalyst/1 ml slurry.

The catalyst: had an aluminium content of 0,98% (mass basis), a magnesium content of 11, 12% (mass basis) and a titanium content of 11.08% (mass basis). The catalyst had a BET surface area of $35.70 m^2/g$ and a pore volume of 0.1298 cc/g.

EXAMPLE 2

Catalyst (B) Preparation.

In a 250 ml flask equipped with a reflux condenser and stirring facilities, 2 g of anhydrous magnesium chloride with a total water content of 1.5% (mass basis) was suspended in 60 ml highly purified hexane. After heating the suspension to 45° C., 2 ml of dibutyl ether was then added to the flask, and the heating stopped. After the heating had been stopped, the mixture was stirred for 3 hours. 9 g of triethyl aluminium ('TEA') was then added dropwise to avoid excessive heat build-up, and the resultant slurry allowed to cool to room temperature under stirring. The slurry was then subjected to twelve washings using 50 ml hexane each time, to obtain an activated support-containing slurry.

To the activated support-containing slurry was added 2 ml of a 3:1.5:1 molar mixture of ethanol: 1-pentanol: 1-hexanol mixture and the slurry stirred for 3 hours. 20 ml of $TiCl_4$ was then added to the slurry, and the resultant mixture stirred under reflux for one hour. After cooling down, the slurry was subjected to ten washings using 50 ml hexane each time. After the final washing the slurry concentration was adjusted, by hexane addition, to 0.01 g magnesium chloride supported titanium catalyst/1 ml slurry.

The catalyst had an aluminium content of 0,95% (mass basis), a magnesium content of 6,53% (mass basis) and a titanium content of 12.15% (mass basis). The catalyst has a BET surface area of $159.21 m^2/g$ and a pore volume of 0.3231 cc/g.

EXAMPLE 3

300 ml of highly purified n-heptane was added to a 1 l stainless steel reaction vessel (reactor) provided with agitation. The reactor was heated to 85° C., and 1 ml of a 10 wt percent solution of TEA was added thereto. 0.1 ml of catalyst B was added to the reactor, and the mixture stirred for five minutes after which the reactor was pressurised to 15 bar with ethylene and the reaction started. The reaction was continued for 60 minutes at constant pressure maintained by ethylene supply after which the ethylene supply closed off and the reactor vented. Iso-propanol was added to deactivate the catalyst and the reaction mixture allowed to cool to room temperature. The slurry was filtered and washed with iso-propanol and acetone, and the resultant polymer dried for 24 hours under reduced pressure in a vacuum oven at 80° C.

The dry polymer in the form of a powder was weighed and 83 g of polymer obtained. The activity of catalyst B was calculated as 83 kg/g catalyst per hour.

EXAMPLE 4

300 ml of highly purified n-heptane was added to a 1 l stainless steel reaction vessel (reactor) provided with agitation. The reactor was heated to 85° C. and 1 ml of a 10 wt percent solution of TEA was added thereto. 0.1 ml of catalyst A was added to the reactor, and the mixture stirred for five minutes after which the reactor was pressurised to 15 bar with ethylene and the reaction started. The reaction was continued for 60 minutes at constant pressure maintained by ethylene supply after which the ethylene supply was closed off and the reactor vented. Iso-propanol was added to deactivate the catalyst and the reaction mixture allowed to cool to room temperature. The slurry was filtered and washed with iso-propanol and acetone, and the resultant polymer dried for 24 hours under reduced pressure in a vacuum oven at 80° C. The dry polymer in the form of a powder was weighed and 58.1 g of polymer obtained. The activity of catalyst A was calculated as 58.1 kg/g catalyst per hour.

EXAMPLE 5

3000 g of highly purified n-heptane was introduced into a 10 l stainless steel polymerisation vessel provided with agitation. After thorough purging of the vessel with nitrogen, 15 ml of triethylaluminium (10% solution in heptane) as a co-catalyst, and 5 ml of catalyst B, were introduced into the vessel. The temperature was set at 85° C. and after 10 minutes of stirring, 1300 mg of hydrogen were added. 1000 g of ethylene, at a constant flow of 4 g/minute, and 1200 g of a 5:1 molar mixture of 1-pentene and 1-hexene at a constant flow of 4.8 g/minute, were introduced into the vessel, with the flows being commenced simultaneously. In a next step, the polymerisation vessel was depressurised and the catalyst decomposed with 1-propanol. The resultant terpolymer was then filtered and repeatedly washed with propanol, methanol and acetone. The terpolymer was dried in a vacuum oven at 70° C. for 24 hours. The yield of the terpolymer was 1000 g.

The composition of the terpolymer as measured by $^{13}C$ NMR was 3.0 molar % comonomer (sum of 1-pentene and 1-hexene) with the molar ratio of the incorporated 1-pentene:1-hexene being 5:1.

EXAMPLE 6

The polymerisation described in Example 5 was repeated, except that 1.2 ml of catalyst A was used instead of catalyst B and 600 g of a 5:1 mixture of 1-butene:1-pentene instead of a mixture of 1-pentene:1-hexene, at a constant flow of 2.4 g/minute. 3000 mg hydrogen were also introduced. The yield of the terpolymer obtained was 290 g. The composition of the terpolymer was 1.5 molar % (sum of 1-butene and 1-pentene) with the molar ratio of the incorporated 1-butene:1-pentene being 5:1. The MFI of the polymer was 3.5.

EXAMPLE 7

Catalyst (C) Preparation

In a 250 ml flask equipped with a reflux condenser and stirring facilities, 2 g of magnesium chloride with a total water content of 1.5% (by mass) was suspended in 60 ml highly purified hexane. 4 ml of dipentyl ether was added to the flask, and the mixture stirred for 3 hours under reflux. Thereafter, the temperature was lowered to ambient temperature and 10 g of triethyl aluminium ('TEA') was added dropwise to avoid excessive heat build-up. The resultant slurry was allowed to cool to room temperature under stirring. The slurry was then subjected to twelve washings using 50 ml hexane each time, to obtain an activated support-containing slurry.

To the activated support-containing slurry was added 2 ml of a 1:1:1 molar mixture of ethanol, 1-butanol and 1-pentanol, and the slurry stirred for 3 hours at ambient temperature. 15 ml of $TiCl_4$ was then added to the slurry, and the resultant mixture stirred under reflux for 2 hours. After cooling down, the slurry was subjected to ten washings using 50 ml hexane each time. After the final washing the slurry concentration was adjusted, by hexane addition, to 0,01 g magnesium chloride supported titanium catalyst/1 ml slurry.

The catalyst had an aluminium content of 1.1% (mass basis), a magnesium content of 12.93% (mass basis) and a titanium content of 7.04% (mass basis). The catalyst has a BET surface area of 112.39 $m^2/g$ and a pore volume of 0.4656 cc/g.

EXAMPLE 8

300 ml of highly purified n-heptane was added to a 1 l stainless steel reaction vessel (reactor) provided with agitation. The reactor was heated to 85° C. and 1 ml of a 10 wt percent solution of TEA was added thereto. 0.1 ml of catalyst C was added to the reactor, and the mixture stirred for five minutes after which the reactor was pressurised to 15 bar with ethylene and the reaction started. The reaction was continued for 60 minutes at constant pressure maintained by ethylene supply after which the ethylene supply was closed off and the reactor vented. Iso-propanol was added to deactivate the catalyst and the reaction mixture allowed to cool to room temperature. The slurry was filtered and washed with iso-propanol and acetone, and the resultant polymer dried for 24 hours under reduced pressure in a vacuum oven at 80° C. The dry polymer in the form of a powder was weighed and 120 g of polymer obtained. The activity of catalyst C was calculated as 120 kg/g catalyst per hour.

EXAMPLE 9

Catalyst C was kept in an Mbraun dry box for one month at ambient temperature and inert conditions. Example 8 was repeated using the same conditions and using catalyst C after one month storage time. An amount of 118 g of polymer were obtained. The activity of the catalyst after one month storage time was 118 kg/g catalyst.

EXAMPLE 10

300 ml of highly purified n-heptane was added to a 1 l stainless steel reaction vessel (reactor) provided with agitation. The reactor was heated to 85° C. and 1 ml of a 10 wt percent solution of TEA was added thereto. 0.1 ml of catalyst C was added thereto, and the mixture stirred for five minutes after which the reactor was pressurised to 15 bar with ethylene and the reaction started. The reaction was continued for 30 minutes at constant pressure maintained by ethylene supply after which the ethylene supply was stopped and the reactor cooled down to 15° C. under stirring. After 6 hours the reactor was reheated and at 75° C. the ethylene supply was restarted. The reaction reached its previous conditions and was continued for another 30 minutes when the ethylene supply was stopped and the reactor cooled down and vented. Iso-propanol was added to deactivate the catalyst and the reaction mixture allowed to cool to room temperature. The slurry was filtered and washed with iso-propanol and acetone, and the resultant polymer dried for 24 hours under reduced pressure in a vacuum oven at 80° C. The dry polymer in the form of a powder was weighed and 122 g of polymer obtained.

EXAMPLE 11

Catalyst (D) Preparation

In a 250 ml flask equipped with a reflux condenser and stirring facilities 2 g of magnesium chloride with a total water content of 5% (by mass) was suspended in 60 ml highly purified hexane. 2 ml of dipentyl ether was added to the flask and the mixture stirred for 3 hours under reflux. Thereafter, the temperature was lowered to ambient temperature and 12 g of triethyl aluminium ('TEA') was added dropwise to avoid excessive heat build-up. The resultant slurry was allowed to cool to room temperature under stirring. The slurry was then subjected to six washings using 50 ml hexane each time, to obtain an activated support-containing slurry.

To the activated support-containing slurry was added 2,2 ml of a 1:2 molar mixture of 1-butanol and 1-pentanol, and the slurry stirred for 2 hours at reflux. 15 ml of $TiCl_4$ was then added to the slurry, and the resultant mixture stirred under reflux for 2 hours. After cooling down, the slurry was subjected to six washing using 50 ml hexane each time. After the final washing the slurry concentration was adjusted, by hexane addition, to 0.01 g magnesium chloride supported titanium catalyst/1 ml slurry.

The catalyst had an aluminium content of 2.63% (mass basis), a magnesium content of 5.06% (mass basis) and a titanium content of 8.82% (mass basis). The measured BET surface area was 20.52 $m^2/g$ and the pore volume 0.071 cc/g.

EXAMPLE 12

300 ml of highly purified n-heptane was added to a 1 l stainless steel reaction vessel (reactor) provided with agitation. The reactor was heated to 85° C. and 1 ml of a 10 wt percent solution of TEA was added thereto. 0.1 ml of catalyst D was added to the reactor, and the mixture stirred for five minutes after which the reactor was pressurised to 15 bar with ethylene and the reaction started. The reaction was continued for 60 minutes at constant pressure maintained by ethylene supply after which the ethylene supply was closed off and the reactor vented. Iso-propanol was added to deactivate the catalyst and the reaction mixture allowed to cool to room temperature. The slurry was filtered and washed with iso-propanol and acetone, and the resultant polymer dried for 24 hours under reduced pressure in a vacuum oven at 80° C. The dry polymer in the form of a powder was weighed and 67.7 g of polymer obtained. The activity of catalyst D was calculated as 67.7 kg/g catalyst per hour.

EXAMPLE 13

3000 g of highly purified n-heptane was introduced into a 10 l stainless steel polymerisation vessel provided with agitation. After thorough purging of the vessel with nitrogen, 150 ml of triethylaluminium (10% solution in heptane) as a co-catalyst, and 5 ml of catalyst D, were introduced into the vessel. The temperature was set at 85° C. and after 10 minutes of stirring, 3000 mg of hydrogen were added. 1000 g of ethylene, at a constant flow of 4 g/minute, and 1000 g of a 1-butene at a constant flow of 4 g/minute, were introduced into the vessel, with the flows being commenced simultaneously. In a next step, the polymerisation vessel was depressurised and the catalyst decomposed with 1-propanol. The resultant terpolymer was then filtered and repeatedly washed with propanol, methanol and acetone. The terpolymer was dried in a vacuum oven at 70° C. for 24 hours. The yield of the terpolymer was 1000 g.

The composition of the terpolymer as measured by $^{13}C$ NMR was 3.0 molar % of butene-1. The density of the copolymer was 0.9175.

EXAMPLE 14

3000 g of highly purified n-heptane was introduced into a 10 l stainless steel polymerisation vessel provided with agitation. After thorough purging of the vessel with nitrogen, 150 ml of triethylaluminium (10% solution in heptane) as a co-catalyst, and 1 ml of catalyst D, were introduced into the vessel. The temperature was set at 85° C. and after 15 minutes of stirring, 3000 mg of hydrogen were added. 1000 g of ethylene, at a constant flow of 4 g/minute, and 1000 of a mixture of 1-pentene and 1-hexene at a 1:9 ratio and at a constant flow of 4 g/minute, were introduced into the vessel, with the flows being commenced simultaneously. In a next step, the polymerisation vessel was depressurised and the catalyst decomposed with 1-propanol. The resultant terpolymer was then filtered and repeatedly washed with propanol, methanol and acetone. The terpolymer was dried in a vacuum oven at 70° C. for 24 hours. The yield of the terpolymer was 390 g.

The composition of the terpolymer as measured by $^{13}C$ NMR was 0.9 molar % of a mixture of 1-hexene/1-pentene (with 1-pentene difficult detectable). The molecular data of the terpolymer have been measured: Mw=116836; Mz=31874; ; Mn=35623 and polydispersity 3.279792.

EXAMPLE 15

Catalyst (E) Preparation

In a 250 ml flask equipped with a reflux condenser and stirring facilities 2 g of anhydrous magnesium chloride with a total water content of 1.5% (by mass) was suspended in 60 ml highly purified hexane. The temperature was raised to 45° C., and 2 ml of dipentyl ether was then added to the flask and the mixture stirred for 3 hours. Thereafter, the heating was stopped, the heat of mixture allowed to dissipate, and the temperature allowed to drop to ambient temperature. 12 g of triethyl aluminium ('TEA') was then added dropwise to avoid excessive heat build-up, and the resultant slurry allowed to cool to room temperature under stirring. The mixture was stirred at room temperature for another 8 hours. The slurry was then subjected to six washings using 50 ml hexane each time, to obtain an activated support-containing slurry.

To the activated support-containing slurry was added 2 ml of a 1:1 molar mixture of ethanol and 1-octanol, and the slurry stirred for 3 hours at ambient temperature. 20 ml of $TiCl_4$ was then added to the slurry, and the resultant mixture stirred under reflux for 2 hours. After cooling down, the slurry was subjected to six washings using 50 ml hexane each time. After the final washing the slurry concentration was adjusted, by hexane addition, to 0.01 g magnesium chloride supported titanium catalyst/1 ml slurry.

The catalyst had an aluminium content of 3.66% (mass basis), a magnesium content of 8.72% (mass basis) and a titanium content of 16.93% (mass basis). The $Ti^{4+}$ was 91.65%; the $Ti^{3+}$ was 8.21% and the $Ti^{2+}$ was 0.095%.

EXAMPLE 16

300 ml of highly purified n-heptane was added to a 1 ml stainless steel reaction vessel (reactor) provided with agitation. The reactor was heated to 85° C. and 1 ml of a 10 wt percent solution of TEA was added thereto. 0.1 ml of catalyst E was added to the reactor, and the mixture stirred for five minutes after which the reactor was pressurised to 15 bar with ethylene and the reaction started. The reaction was continued for 60 minutes at constant pressure maintained by ethylene supply after which the ethylene supply was closed off and the reactor vented. Iso-propanol was added to deactivate the catalyst and the reaction mixture allowed to cool to room temperature. The slurry was filtered and washed with iso-propanol and acetone and the resultant polymer was dried for 24 hours under reduced pressure in a vacuum oven at 80° C. The dry polymer in the form of a powder was weighed and 78 g of polymer obtained. The activity of catalyst E was calculated as 78 kg/g catalyst per hour.

EXAMPLE 17

300 ml of highly purified n-heptane was added to a 1 l stainless steel reaction vessel (reactor) provided with agitation. The reactor was heated to 85° C. and 1 ml of a 10 wt percent solution of TEA was added thereto. 0.1 ml o catalyst E was added to the reactor, and the mixture stirred for five minutes after which an 80 g of ethylene were fed to the reactor at a flow of 4 g/min. Concomitantly a feed of 4 g/min of 80 g of 1-octene was started. The reaction was continued for another 20 minutes under stirring and further cooled down under stirring to room temperature where the reactor was vented. Iso-propanol was added to deactivate the catalyst and the reaction mixture allowed to cool to room temperature. The slurry was filtered and washed with iso-propanol and acetone, and the resultant polymer was dried for 24 hours under reduced pressure in a vacuum oven at 80° C. The dry polymer in the form of a powder was weighed and 78 g of polymer obtained.

EXAMPLE 18

Catalyst (F) Preparation

To 4 g of $MgCl_2$, 4 ml of di-n-butyl ether was added in a drybox and the suspension ground for 1 hour. It was then stirred for another 3 hours at 45° C. and left to stand for 24 hours. A sample of the solid material had a BET surface area of 2.51 $m^2/g$, a pore volume of 0.0121 cc/g and a measured sedimentation time of 5 minutes.

100 ml of a 10% triethyl aluminium solution in heptane was added dropwise to this solid material and continuously stirred. After all the triethyl aluminium had been added, the suspension was stirred for a further 3 hours. The slurry was washed twelve times using 50 ml heptane each time, and after the last washing, the heptane was allowed to evaporate. This powder had a BET surface area of 6.48 $m^2/g$, a pore volume of 0.0268 cc/g and a measured sedimentation time of 5 minutes.

To the dry powder, 0.2 ml ethanol, 0.37 ml pentanol and 0.42 ml hexanol were added. To the resulting lumpy solid, 20 ml heptane were added and the material ground to a fine precipitate. 7 ml $TiCl_4$ was slowly added to this suspension and refluxed under inert conditions for 60 minutes. After cooling the slurry was washed ten times using 200 ml heptane each time. The concentration of the final slurry was adjusted to 0.01 g/ml.

The final catalyst had a BET surface area of 38.9 $m^2/g$, a pore volume of 0.1 cc/g and a measured sedimentation time of 15 minutes. Chemical analyses showed that the catalyst contained (on a mass basis) 0.1802% Al, 11.4963% Mg and 6.9060% Ti. The Ti oxidation states were 0.688% $Ti^{2+}$, 4.107% $Ti^{3+}$ and 95.205% $Ti^{4+}$.

EXAMPLE 19

300 ml of highly purified n-heptane was added to a 1 l stainless steel reaction vessel (reactor) provided with agitation. The reactor was heated to 85° C. and 1 ml of a 10 wt percent solution of TEA was added thereto. 0.1 ml of catalyst F was added to the reactor, and the mixture stirred for five minutes after which the reactor was pressurised to 15 bar with ethylene and the reaction started. The reaction was continued for 60 minutes at constant pressure maintained by ethylene supply after which the ethylene supply was closed off and the reactor vented. Iso-propanol was added to deactivate the catalyst and the reaction mixture allowed to cool to room temperature. The slurry was filtered and washed with iso-propanol and acetone, and dried for 24 hours under reduced pressure in a vacuum oven at 80° C. The resultant dry polymer in the form of a powder was weighed and 14.4 g of polymer obtained. The activity of catalyst F was calculated as 14.4 kg/g catalyst per hour.

In the Examples, the following methods of analyses of the catalysts were used.

Al, Mg and Ti content was determined by Inductively Coupled Plasma (ICP);

$Cl^-$ content was determined by Ion Chromatography;

The nature and concentration of organic species were determined by Gas Chromatography (GC) and Gel Chromatography coupled with Mass Spectrophotometry (GC/MS);

The sum of $Ti^{2+}$ and $Ti^{3+}$ was determined by UV/VIS absorbance of a 1,10-phenanthroline complex with $Fe^{2+}$ obtained by reduction of $Fe^{3+}$ in methanol; $Ti^{2+}$ was determined from the amount of $H_2$ evolved by reacting with protons formed when reacting the catalyst with methanol.

What is claimed is:

1. A method of making a catalyst suitable for the polymerization of olefins, which method comprises mixing an ether having a total number of carbon atoms equal to or greater than 8, with hydrated magnesium chloride having a water content of between 0.02 mole of water/1 mole of magnesium chloride and 2 moles of water/1 mole of magnesium chloride, to produce partially activated magnesium chloride;

mixing a trialkyl aluminum in liquid form or as a solution in an inert hydrocarbon liquid, with the partially activated magnesium chloride, to form an unwashed activated magnesium chloride slurry;

washing the unwashed activated magnesium chloride in the slurry with an inert saturated hydrocarbon liquid, to obtain an activated magnesium chloride-containing slurry;

mixing a plurality of alcohols with the activated magnesium chloride-containing slurry to form an activated magnesium chloride/alcohol complex; and mixing titanium tetrachloride with the activated magnesium chloride/alcohol complex, to form a magnesium chloride supported titanium catalyst.

2. A method according to claim 1, wherein the mixing of the ether with the hydrated magnesium chloride is effected under inert conditions at a temperature between 40° C. and 140° C., and with the magnesium chloride and the ether being used in such proportions that the molar ratio of magnesium chloride to ether is between 0.3:1 and 3:1.

3. A method according to claim 2, wherein the hydrated magnesium chloride has a water content of either 1.5% (by mass) or 5% (by mass).

4. A method according to claim 2, wherein the ether is dipentyl ether or dibutyl ether.

5. A method according to claim 2, wherein the trialkyl aluminium, the magnesium chloride and the ether are used in such proportions that formula (1) is complied with:

$$A > B+C+D \tag{1}$$

where
- A represents the total moles of the trialkyl aluminium used;
- B represents the total moles of magnesium chloride used;
- C represents the total moles of ether used; and
- D represents the total moles of water present, being the sum of the water of hydration associated with the magnesium chloride and any water traces in any carrier liquid used.

6. A method according to claim 1, wherein the mixing of the trialkyl aluminium with the partially activated magnesium chloride is effected by adding the trialkyl aluminium dropwise to a mixture of the magnesium chloride and the ether, while stirring the mixture, or to a suspension or slurry of the magnesium chloride and the ether in an inert saturated hydrocarbon carrier liquid, while stirring the suspension.

7. A method according to claim 1, wherein the amounts of the alcohols used are such that (i) formula (2) is complied with:

$$[A] < [Al] \tag{2}$$

where [A] represents the total moles of alcohols used, and [Al] is the measured moles of aluminium present in the activated magnesium chloride-containing slurry; or (ii) formula (3) is complied with:

$$[A] < 2[Al]/3 \tag{3}$$

or (iii) formula (4) is complied with:

$$[A] < [Al]/3 \tag{4}$$

8. A method according to claim 1, wherein the activated magnesium chloride has a sedimentation time, $T_1$, of less than 20 minutes, while the magnesium chloride supported titanium catalyst has a sedimentation time, $T_2$, of less than 30 minutes.

9. A catalyst when prepared by a method according to claim 1, and which contains a mixture of $Ti^{3+}$ and $Ti^{2+}$ such that the sum of $Ti^{3+}$ and $Ti^{2+}$ is less than 50% of the total titanium present therein and/or the ratio of $Ti^{3+}$ to $Ti^{2+}$ is greater than 5:1.

10. A catalyst according to claim 9, wherein the sum of $Ti^{3+}$ and $Ti^{2+}$ is less than 10% of the total titanium present therein.

11. A catalyst according to claim 9, which has a sedimentation time of less than 30 minutes.

12. A catalyst system which comprises
- a catalyst according to claim 9; and
- an aluminium compound, as a co-catalyst.

13. A magnesium chloride-supported titanium catalyst comprising hydrated magnesium chloride having a water content of between 0.02 mole of water/1 mole of magnesium chloride and 2 moles of water/1 mole of magnesium chloride, titanium and aluminium, and having a total aluminium content between 0.1% and 6% (mass basis), a total magnesium content between 3% and 15% (mass basis), a total titanium content between 3 and 15% (mass basis), and containing a mixture of $Ti^{3+}$ and $Ti^{2+}$ such that the sum of $Ti^{3+}$ and $Ti^{2+}$ is less than 50% of the total titanium present therein, and/or the ratio of $Ti^{3+}$ to $Ti^{2+}$ is greater than 5:1, with the mass ratio of magnesium to titanium therein being below 3:1.

14. A magnesium chloride-supported titanium catalyst comprising activated magnesium chloride as a catalyst support, with the support being the product of the reaction of hydrated magnesium chloride having a water content of between 0.02 mole of water/1 mole of magnesium chloride and 2 moles of water/1 mole of magnesium chloride, an ether and a trialkyl aluminium, which product has been subjected to washing with an inert saturated hydrocarbon, the ether is selected from the range of ethers having a total number of carbon atoms equal to or greater than 8, and the trialkyl aluminium is used in an amount greater than the sum of the moles of magnesium chloride, the moles of ether and the moles of water present and has no halogen content; and titanium as an active component, with the catalyst having a total aluminium content between 0.1% and 6% (mass basis), a total magnesium content between 3% and 15% (mass basis), and a total titanium content between 3% and 15% (mass basis).

15. A catalyst according to claim 14, which is a reaction product of the activated magnesium chloride support, a plurality of alcohols, and titanium tetrachloride, with the catalyst containing a mixture of $Ti^{3+}$ and $Ti^{2+}$, such that the sum of $Ti^{3+}+Ti^{2+}$ is less than 50% of the total titanium present therein and/or the ratio of $Ti^{3+}$ to $Ti^{2+}$ is greater than 5:1.

* * * * *